Sept. 24, 1929.  M. STUBNITZ  1,729,559
AIR CUSHION SEAT AND METHOD OF ASSEMBLING THE SAME
Filed July 31, 1926  2 Sheets-Sheet 1
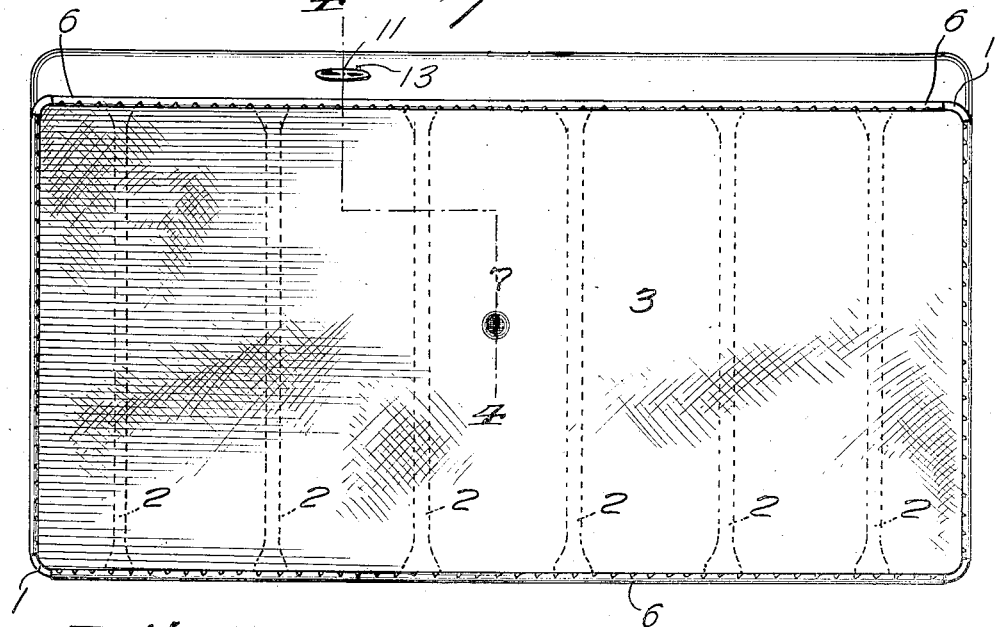
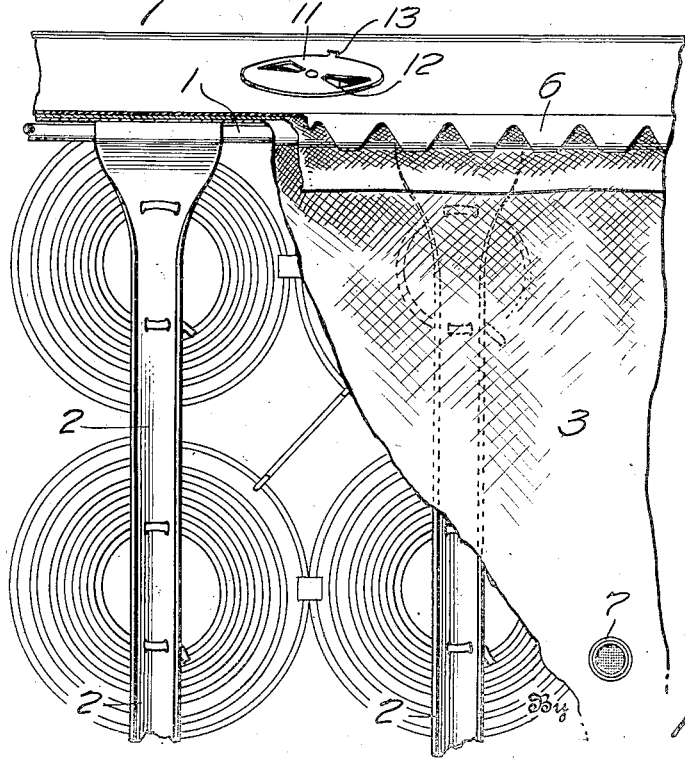
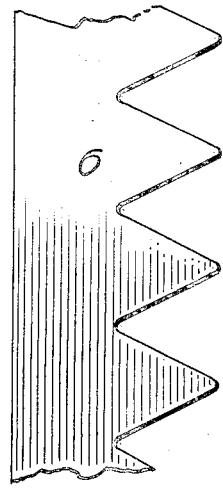
Inventor
MAURICE STUBNITZ,
K.P. McElroy,
Attorney Sept. 24, 1929.   M. STUBNITZ   1,729,559
AIR CUSHION SEAT AND METHOD OF ASSEMBLING THE SAME
Filed July 31, 1926   2 Sheets-Sheet 2
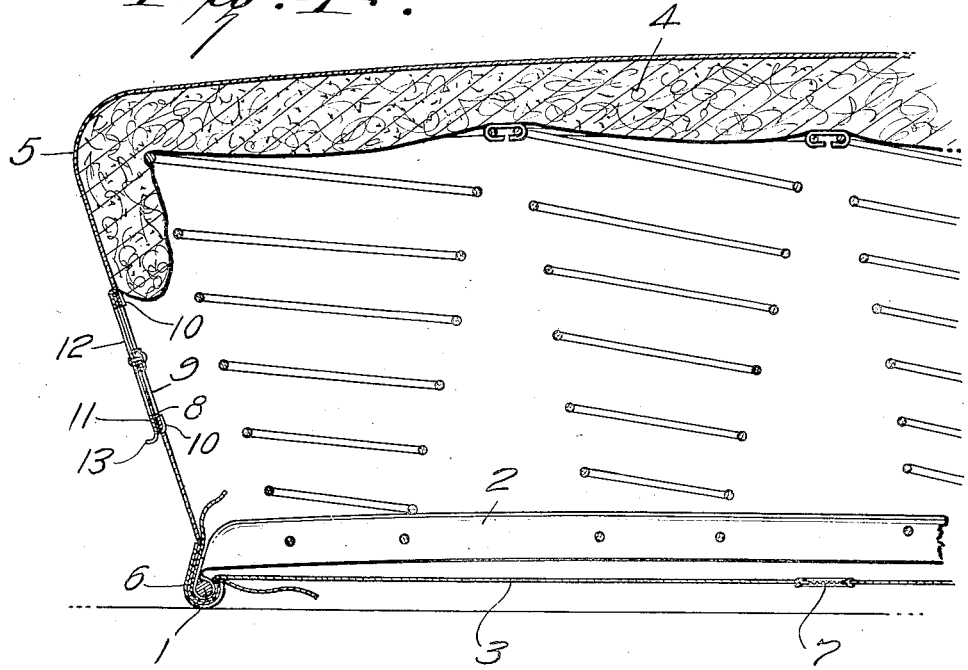
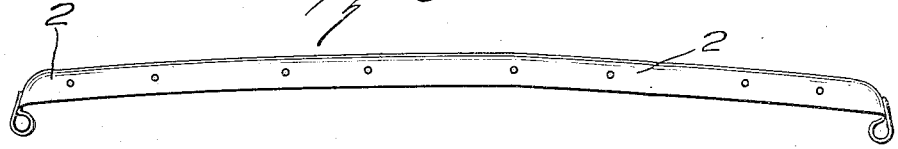
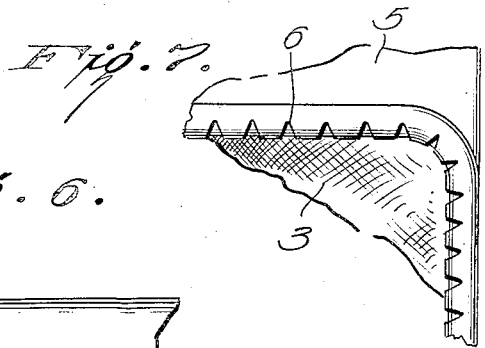
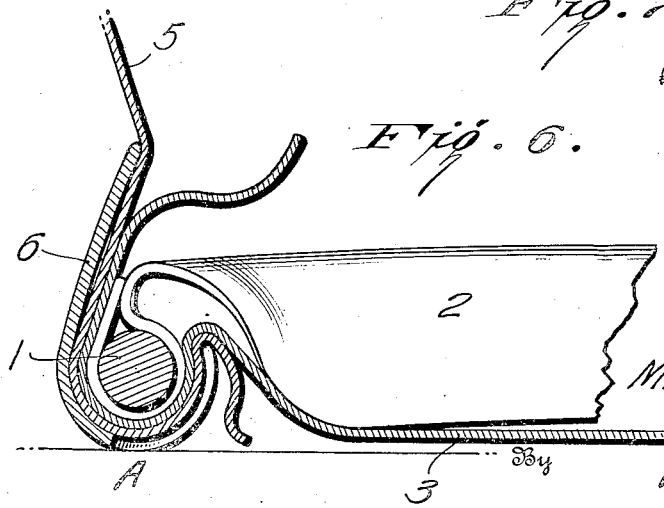
Inventor
MAURICE STUBNITZ,
By K. P. McElroy,
Attorney Patented Sept. 24, 1929

1,729,559

UNITED STATES PATENT OFFICE

MAURICE STUBNITZ, OF PITTSBURGH, PENNSYLVANIA, ASSIGNOR TO FORT PITT BEDDING COMPANY, OF PITTSBURGH, PENNSYLVANIA, A CORPORATION OF PENNSYLVANIA

AIR CUSHION SEAT AND METHOD OF ASSEMBLING THE SAME

Application filed July 31, 1926. Serial No. 126,316.

This invention relates to air cushion seats and methods of assembling the same; and it comprises a cushion seat having a cover portion extending over the top and sides of a spring frame, and a bottom portion of a material which is substantially impervious to air, clamped to the said spring frame simultaneously with and overlapped by the cover portion, and extending over the bottom of the seat in a plane above that of the lower edge of said spring frame so that, when the cushion seat is in use, its edges only will rest upon the support provided therefor and its bottom portion will be spaced above such support, the edges of said bottom portion being protected from wear by the said clamping means; and it also comprises a cushion seat so constructed that its interior provides a closed air chamber, with one or more openings in the cushion for restricting the flow of air from the interior thereof upon sudden shock tending to collapse it against the action of its springs; and it further comprises the method of assembling a cushion seat which consists in inverting the spring seat frame upon a layer of covering material, covering the bottom of said frame with a material which is substantially impervious to air, partially collapsing the frame, folding the covering material inwardly about the bottom of said frame to overlap the bottom material, applying a clamp to the edge of said frame for holding the cover and bottom materials permanently in position, and in finally relieving the frame of collapsing pressure to permit it to assume a normal, extended condition under the influence of its springs; all as more fully hereinafter set forth and as claimed.

Spring seats which are closed at the bottom to produce an air cushioning effect for assisting the cushioning effect of the seat springs are not new, but the bottoms of such seats are quickly worn because of rubbing against the support for the seat when it is in use, this resulting in rapid wear of the bottom material and consequent destruction of the air cushioning effect which is sought. Moreover, without exception so far as applicant is aware, where cushion seats have been supplied with fabric bottoms, such bottoms are sewed or tacked to the spring frame independently of the seat cover. Where a metal frame is used sewing must be resorted to, but this is laborious and prohibitively expensive. If a wooden frame is used the practice has heretofore been to tack the bottom material in place. However, when this is done the edges of the bottom material rub against the support which is provided for the seat, thus wearing the material rapidly along its edges and forming holes which destroy the air cushioning effect. Wood frames, moreover, are much more expensive than the metal frames in present use when they are properly made to withstand the shocks and strains to which a seat is subjected.

In the present invention these difficulties are overcome by clamping the cover and bottom portions of the seat to the frame in a single operation, and by so forming the transverse spring supporting bars of the frame that the bottom material of the seat cushion is spaced above the lower edge of the spring frame and is consequently protected by the edge of the frame when the seat is in use. The edges of the cover portion and bottom material of the cushion are wrapped about the lower edge of the spring frame in overlapping relation and a clamp is then applied to hold them both permanently in position. Inasmuch as the cushion is supported, in use, by the lower edge of its spring frame, rubbing and wear due to the shifting of the cushion relative to its support are resisted by the metal clamping member which extends around, or substantially around, the periphery of the frame.

It is accordingly an object of my invention to provide a cushion seat the spring frame of which is completely enclosed by a cover and bottom clamped to such frame by a single operation.

Another object is to provide a cushion seat, the spring frame of which is completely enclosed by a cover and bottom, the bottom extending across the frame above the plane of the lower edges thereof.

Other and further objects will be apparent from the following description and the accompanying drawings in which:

Figure 1 is a perspective view of the cushion seat from its under side;

Figure 2 is a detail perspective view of a fragment of the cushion seat from its under side, partly broken away to show interior construction;

Figure 3 is a developed view of the clamping strip which is used in fastening the fabric of the seat to the border frame;

Figure 4 is a vertical sectional view taken along the line 4—4 of Figure 1 showing the use of unrecessed transverse bars or slats;

Figure 5 is a view of one form of transverse bar used in bridging the lower border frame of the cushion seat, this being known as the unrecessed type of bar;

Figure 6 is an enlarged fragmentary sectional view taken through the lower border frame of a cushion seat showing the use of another form of transverse bar therewith, this latter being known as a recessed slat or bar; and Figure 7 is a fragmentary view of a corner of the cushion seat bottom showing an alternative form of clamp, similar in configuration to that shown in Sheet 1 of the drawings but comprising one continuous piece of metal which extends entirely around the lower border frame of the seat cushion.

As shown in the drawings, a lower border frame 1, of rectangular or any other desired shape, has a plurality of parallel transverse bars 2 extending thereacross, such bars being fastened to the frame 1 by wrapping their flattened ends thereabout. The bars are of channel shape in cross-section, and in use, the channeled body portions of the bars extend to a point overlying the lower border frame, the flattened ends of the bars being bent backwardly and around the frame from the inside out with their extreme ends abutting against the shoulder formed by the overhang of the body portions of such bars, thereby providing a rigid support for a clamp as will be hereinafter described. Although it is preferable to wrap the ends of the bars around the frame from the inside out, they may be wrapped downwardly around the outside of the frame and upwardly inside of the said frame. The transverse bars 2 are arched so that no part of them lies below or in the plane of the lower edge of the bottom border frame.

A plurality of helical springs are attached to the respective transverse bars 2, and support a layer of padding or cushioning material 4 over which is stretched the outer leather or fabric cover 5.

In assembling the seat cushion the cover 5 is spread upon a flat surface and the padding 4 placed thereon. The spring frame is then placed bottom up upon the padding, and the material 3 spread over the bottom of the frame with its edges extending beyond the edges of the frame. The springs of the frame are, thereafter, partially collapsed by downward pressure upon the bottom of the frame, and the cover is folded inwardly to cover the sides of the frame and extend inwardly of its bottom border. A metal clamp 6 is then affixed to the lower border of the spring frame and, by a single clamping operation grips the frame firmly and holds the overlapping materials 3 and 5 in permanent position. The pressure upon the springs is then relieved to permit them to assume their normal position and thereby hold the cover 5 taut. The clamp 6 is preferably of the shape shown, having one of its edges serrated, although my invention is not restricted to this specific form of clamp. It is an advantageous construction however, in that it can extend entirely around the frame, for by reason of the serrations it can be bent for application to the corners of the frame, as shown in Figure 7, without causing bulging or bunching. The clamp 6, as applied to the lower border frame extends up around the inside of the frame a substantial distance, and its exterior face is of sufficient width to bear against the extremity of the wrapped end of each transverse bar, being thereby rigidly supported.

The bottom material 3, being held at its edges by the inturned edge of clamp 6 extends across the bottom of the seat frame at a substantial distance above the plane of the lowermost edge of the frame, and where unrecessed slats or transverse bars are used, as shown in Figure 4, it is not bulged downwardly by contact of the bars therewith, since the transverse bars lie above the plane of the bottom material. Where, however, recessed slats are used, as is shown in Figure 6, the bottom material 3 is pressed downwardly by the deep shoulders of such bars, but not to such an extent that it contacts with the support, A, for the seat. Since, in such construction, there is no relative movement between the bars and bottom fabric, the bottom fabric will not be worn by such contact, and, being in a plane above the seat support A it cannot be worn by rubbing thereagainst.

One or more eyelets 7, preferably covered with wire gauze are ordinarily provided in the bottom fabric 3 of the seat cushion to permit air to enter or leave the interior of the cushion at a limited rate when the cushion is suddenly extended or collapsed by shock. Such eyelets may equally well be provided in the sides of the cushion if desired.

From the foregoing it will be apparent that I have provided a cushion seat which is easily and economically assembled, and which is permanently adapted to retain a body of air by reason of the provision of a bottom material so mounted upon the frame of the seat that it is not subjected to wear and consequent rapid destruction of the air cushioning effect.

What I claim is:

1. The method of assembling an air cushion seat which comprises spreading a cushion covering material upon a flat surface, placing a spring frame upon such material in inverted position, covering the bottom of said spring frame with a material which is substantially impervious to air, so that its edges extend over the edges of the spring frame, folding the cushion covering material inwardly to overlap the bottom material and applying a clamp to the edge of the frame for holding the cover and bottom materials thereof permanently in position.

2. The method of assembling an air cushion seat which comprises spreading a cushion covering material upon a flat surface, placing a layer of padding thereon, inverting a spring frame and positioning it to overlie said padding, covering the bottom of said spring frame with a material which is substantially impervious to air, so that its edges extend beyond the edges of said spring frame, partially collapsing said spring frame to reduce its depth, folding the cushion covering material inwardly to overlap the bottom material, applying a clamp to the edge of the frame for holding the cover and bottom materials thereof permanently in position, and finally in relieving the collapsing pressure on said frame to permit it to resume its normal shape thereby rendering the cushion covering material taut.

3. An air cushion seat comprising a spring frame having a lower border member, a bottom material extending over the lower border member, a cushion cover comprising top and side portions, the side portions thereof being folded inwardly over the lower border of said frame to overlap the bottom material thereof, and clamping means for holding the cover and bottom in assembled position on the spring frame in such manner that the said bottom will lie in a plane above that of the lower edge of said lower border member.

In testimony whereof, I have hereunto affixed my signature.

MAURICE STUBNITZ.